Feb. 6, 1968     N. C. GREEN ET AL     3,368,044

INERTIA RESPONSIVE DEVICES

Filed Jan. 10, 1966     3 Sheets-Sheet 1

INVENTORS:—
Norman Charles Green and
David Edward Mohrs,
BY
Wolfe, Hubbard, Voit and Osann,
ATTORNEYS Feb. 6, 1968  N. C. GREEN ET AL  3,368,044
INERTIA RESPONSIVE DEVICES
Filed Jan. 10, 1966  3 Sheets-Sheet 2

INVENTORS:-
Norman Charles Green and
David Edward Morris,
BY
Wolfe, Hubbard, Voit & Osann.

ATTORNEYS

Feb. 6, 1968    N. C. GREEN ET AL    3,368,044
INERTIA RESPONSIVE DEVICES

Filed Jan. 10, 1966    3 Sheets-Sheet 3

INVENTORS:-
Norman Charles Green and
David Edward Morris,
BY
Wolfe, Hubbard, Voit & Osann,
ATTORNEYS

United States Patent Office 3,368,044
Patented Feb. 6, 1968

3,368,044
INERTIA RESPONSIVE DEVICES
Norman C. Green, Maidenhead, and David E. Morris, Sudbury Town, England, assignors to Graviner (Colnbrook) Limited, London, England, a British company
Filed Jan. 10, 1966, Ser. No. 519,662
Claims priority, application Great Britain, Jan. 13, 1965, 1,590/65
13 Claims. (Cl. 200—61.45)

ABSTRACT OF THE DISCLOSURE

An inertia responsive device is disclosed comprising a spherical inertia element supported between and in contact with two facing inclined surfaces. The inclined surfaces are interconnected for synchronous movement away from one another when the inertia element applies a force to one of the members as a result of change of velocity of the device.

---

This invention relates to inertia responsive devices, that is to say devices which perform a desired function when subjected to a predetermined change of velocity.

Inertia responsive devices find many applications, for example in the protection of moving craft in crashes where the inertia responsive device operates as a result of the deceleration occurring in a crash, the operation of the inertia responsive device in turn initiating the operation of fire extinguishers and/or other safety precautions. Inertia responsive devices may also be employed in missile fuses and for other purposes.

According to the present invention there is provided an inertia responsive device comprising an inertia element and two members between which said inertia element is trapped, said two members being connected to one another so as to be movable in synchronism away from one another when said inertia element applies a force to either or both of the members as a result of the inertia element being subjected to a change of velocity.

The invention also provides an inertia responsive device comprising two members having surfaces inclined to one another and an inertia element normally contacting both surfaces, said members being coupled together so that when said inertia element is subjected to a predetermined change of velocity of predetermined duration its movement causes said two members to move apart from one another to effect a desired operation.

Figure 1:
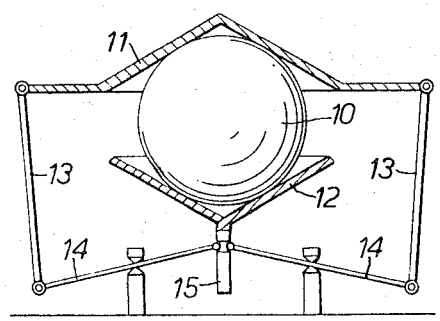
Figure 2:
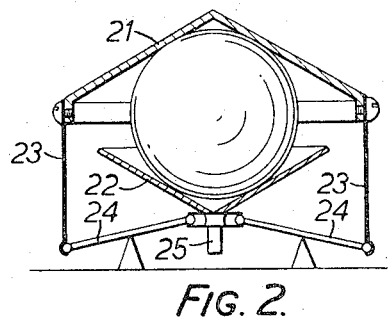
Figure 5:
Figure 6:
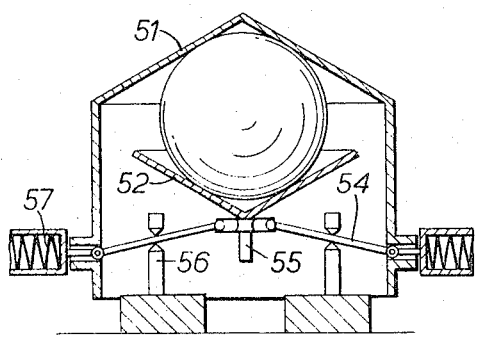
Figure 7:
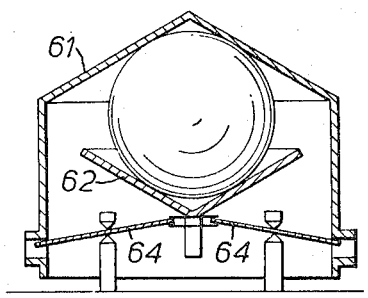
Figure 8:
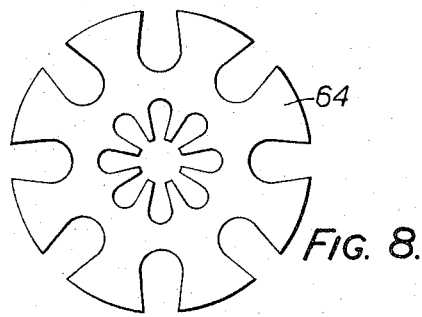
Figure 9:
Figure 13:
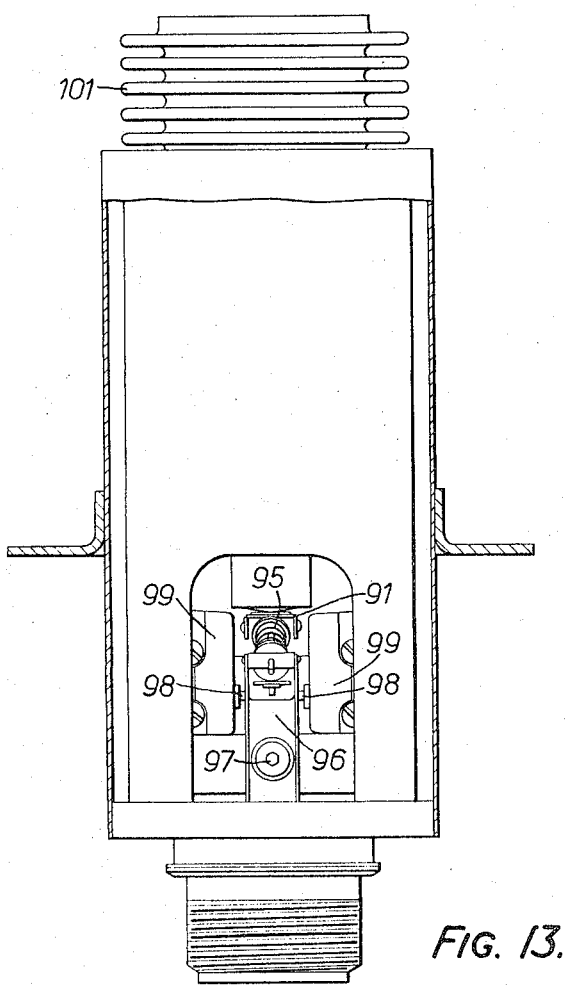
Figure 10:
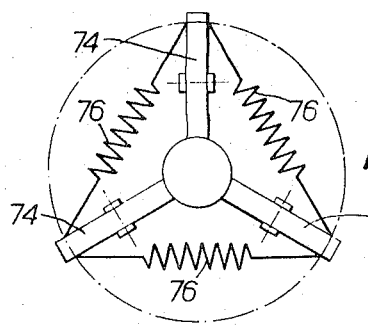
Figure 11:
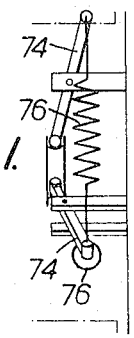
Figure 12:
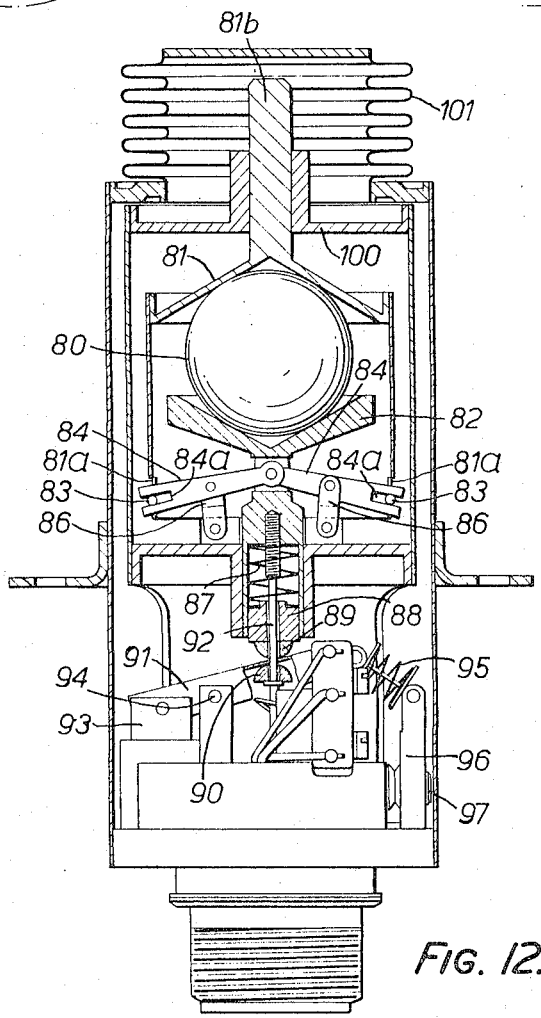

A number of typical constructions of inertia responsive devices in accordance with the present invention will now be described, by way of example, with reference to the accompanying drawing in which:

FIGURE 1 is a side elevation in diagrammatic form of one construction of such device showing the principle of operation of devices in accordance with the invention, FIGURES 2 to 7 are similar views to FIGURE 1 showing further typical constructions, FIGURES 8 and 9 are respectively plan and side elevations of a spring disc for use in the FIGURE 7 construction, FIGURES 10 and 11 are similar views to FIGURES 8 and 9 showing an alternative arrangement of resilient means, and FIGURES 12 and 13 show in greater detail a typical construction of inertia switch, FIGURE 12 being a sectional side elevation and FIGURE 13 being a view at right angles to FIGURE 12 with the case partly broken away.

The principle on which inertia responsive devices in accordance with the present invention is based is illustrated in FIG. 1. The inertia element is a ball 10 which is trapped between two cones 11 and 12 and the cones are pivotally interconnected, for example by links 13 and pivoted levers 14 connected to one another and to the cones by pivotal connections, so that in whichever direction the ball 10 moves the corresponding movement of one of the cones 11 and 12 causes a movement in the opposite direction of the other cone. The object of this interconnection of the cones 11 and 12 is so that irrespective of which cone is displaced by movement of the ball 10 there is movement of an actuating member 15 to effect the desired operation, which latter may, for example, be a change of state of an electrical circuit, which will normally be by opening or closing of contacts, or ignition of an explosive charge. It will be seen that the inertia device will respond to a deceleration of the device in any direction whether upwards, downwards, sideways in either direction or in any direction intermediate such directions. An important feature, apart from this all-round response to deceleration, is that the inertia effect of one cone is cancelled out by the inertia effect on the other cone due to their inter-connection so that theoretically the ratio of ball weight to cone weight is infinity.

Clearly, to ensure that the actuating member only operates when a predetermined magnitude of deceleration occurs, it is necessary to introduce resistance to movement of the actuating member which is conveniently effected by resilient means. FIGURES 2 to 11 illustrate in diagrammatic form how such resilient means may be incorporated in the basic construction. Thus in FIGURE 2 cantilever leaf springs 23 act as the links between the upper cone 21 and the pivoted levers 24 connected to the lower cone 22 and provide a snap action movement of the actuating member 25 when the downward movement of the lower cone 22 is such that the pivoted levers 24 pass the central position.

Figure 3:
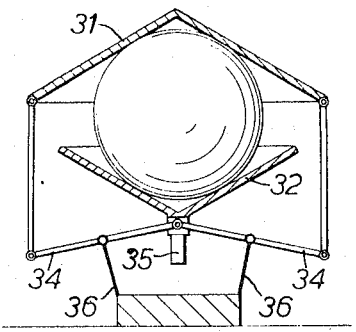

In FIGURE 3 the construction is similar to that of FIGURE 1 except that the levers 34 which couple the lower cone 32 to the upper cone 31 do not have a fixed pivot. Instead the pivot point of each lever 34 is provided by the free end of a cantilever leaf spring 36 so that as the cones 31 and 32 move apart the leaf springs 36 flex outwardly until the central position is passed whereupon the further downward movement of the actuating member 35 is with a snap action.

Figure 4:
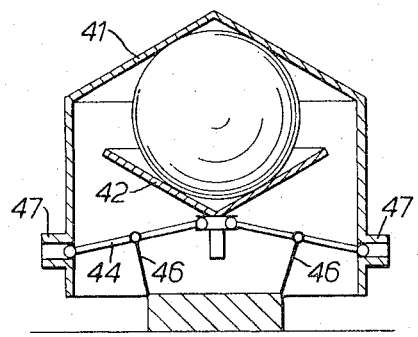

The construction shown in FIGURE 4 also employs cantilever leaf springs 46 but in this case instead of employing links to couple cones 41 and 42 via levers 44 the upper cone 41 is extended downwardly and is provided with sockets 47 in each of which the ball-shaped end of a respective one of the levers 44 may travel as the cones move apart.

FIGURE 5 is a scrap view showing an alternative to the use of the leaf spring 46, namely a rigid cantilever 46b pivoted at its lower end and with a spring 46a opposing its outward pivoting.

FIGURE 6 illustrates a similar construction to that of FIGURE 4 except that in place of the leaf spring pivot 46 a fixed pivot 56 is provided and the outward movement of the ball-shaped end of lever 54 is opposed by spring 57 when the cones 51 and 52 move apart.

In the FIGURE 7 construction a resilient snap-action disc 64 of the form shown in FIGURES 8 and 9 is used as the coupling between the upper cone 61 and the lower cone 62, this disc snapping over from the convex form shown in FIGURE 7 to the concave form, after a sufficient movement apart of cones 61 and 62.

In place of the snap action disc 64 FIGURES 10 and 11 show an alternative construction in which the pivoting of the levers 74, with consequent separation of their outer ends, is opposed by tension springs uniting the outer ends of each pair of levers 74.

Referring now to FIGURES 12 and 13 these show in greater detail a typical construction of inertia switch in accordance with the invention.

In this construction the ball inertia element 80 is trapped between an upper cone 81 and a lower cone 82. The upper cone 81 has a downwardly depending skirt at the lower end of which diametrically opposed slots 81a are provided to accommodate the outer end of a respective one of two levers 84 whose inner ends are pivotally connected to one another and to the lower cone 82. A pivot pin 83 extends across each of the slots 81a and passes through a further slot 84a in the end of the lever 84 so that the outer end of the lever 84 can slide relative to the pivot pin 83 as the lever 84 pivots about its central pivot. Then central pivot for each lever 84 is provided by a pivot link 86 whose lower end is pivotally connected to the chassis of the switch.

The lower cone 82 is provided, beneath the pivot connecting the levers 84, with a spring housing in which a spring 87 is trapped by a plug 88 which is slidable in the spring housing against the opposition of the spring 87. In this condition the spring 87 is partially compressed.

An upper hemispherical head 89 and a lower hemispherical head 90 are located on opposite sides of a channel-shaped toggle beam 91. The lower head 90 is fixed on a spindle 92 whose upper end is secured to the lower cone 82, both the plug 88 and the upper head 89 being slidable on the spindle 92. The toggle beam 91 is pivotally connected at one end to the piston (not shown) of an anti-vibration damper 93, is pivotally supported at an intermediate position 94 and has its other end connected to one end of a toggle spring 95.

Adjustment of the pressure required to pivot the toggle beam 91 is by means of alteration of the position of that end of the spring 95 which is not connected to the beam 91, alteration of that position being effected by movement of the strut 96 by rotation of an adjusting screw 97.

A change of inertia of predetermined amount will cause the inertia element 80 to move relative to the cones 81, 82 and as already explained in connection with FIGURE 1 this will cause movement apart of the upper and lower cones. The downward movement of the lower cone 82 causes downward movement of the upper head 89 and with a predetermined change of velocity of sufficient duration the movement is such that the toggle beam 91 passes its central position so that it snaps over and operates the pins 98 of microswitches 99. This will cause a change of state of the contacts of the microswitches, either opening or closing the contacts, to cause a corresponding change of state of electrical circuits connected thereto.

The fluid damper 93 damps out vibrations. False operation by shocks of short duration is prevented by the anti-vibration damper assembly 93 and the spring 87. Movement of the inertia element 80 as the result of a shock, which corresponds to a very high rate of change of velocity, will move the upper cone 81 to the limit of its possible movement in which it engages the top plate 100 of the chassis. The corresponding movement of the lower cone 82 will not cause tripping of the toggle beam 91 because it is prevented from moving at such a rate by the fluid damper 93. Thus the spindle 92 will slide through both the plug 88 and the upper head 89 with corresponding compression of the spring 87. Because of the short duration of the change of velocity the cones 81, 82 are restored to their normal position by partial decompression of the spring 87 before the toggle beam 91 has moved to its central position due to the time delay resulting from the fluid damping. In this way only a change of velocity of predetermined duration can produce the required pivoting of the toggle actuating beam. The switch can be reset after testing by downward pressure on a rod 81b extending upwardly from the upper cone 81. As the case of the switch is sealed manual pressure is applied to the rod 81b via the top plate of a flexible bellows 101.

It will be understood that many other forms of construction are possible working on the same principle. For example the coupling between the two cones could be by gearing, chain or belt transmission, fluid coupling, rack and pinion or other means. Moreover, the inertia element need not be a complete sphere, the surfaces of the inertia element which contact the cones may be caps of spheres. Moreover, the members moved by the inertia element need not have conical surfaces but may have other suitable shapes relative to the shape of the inertia element.

We claim:

1. An inertia responsive device comprising
   an inertia element,
   a first member,
   a second member, said first and second members having surfaces inclined relative to one another, said surfaces contacting opposite sides of said inertia element, and
   coupling means, said coupling means interconnecting said first and second members to one another for synchronous movement, said coupling means comprising first means connected to said first member and moving therewith, second means connected to said second member and moving therewith, and movement-reversing means connecting said first and second means whereby said first and second members move away from one another when said inertia element applies a force to at least one of the members as a result of the inertia element being subjected to a predetermined change of velocity.

2. A device according to claim 1, wherein at least one of said surfaces is conical.

3. A device according to claim 1, wherein at least those surfaces of said inertia element which contact the surfaces of said first and second members are each a cap of a sphere.

4. A device according to claim 1, wherein said inertia element is spherical.

5. A device according to claim 1, and further comprising an actuating member, wherein said coupling means comprises a pivotal linkage which pivots when said first and second members move, pivoting of said linkage effecting movement of said actuating member to effect a predetermined operation.

6. A device according to claim 1, further comprising resilient means connected to at least one of said first and second members whereby movement apart of said first and second members is opposed by said resilient means.

7. A device according to claim 1, further comprising fluid damping means connected to at least one of said first and second members, whereby movement apart of said members is subject to fluid damping.

8. An inertia responsive device, comprising
   a body portion,
   a first member movably mounted on said body portion and having a conical surface,
   a second member having a conical surface,
   said first and second members having their respective said conical surfaces facing each other,
   a spherical inertia element supported by said first and second members, two opposite portions of the surface of said spherical inertia element being contacted respectively by the said conical surfaces of the members, and
   coupling linkage interconnecting the first and second members to one another for synchronous movement away from one another when said inertia element applies a force to at least one of the members as the result of the inertia element being subjected to a predetermined change of velocity, said coupling linkage including at least one lever, means pivotally supporting the said one lever intermediate its ends relative to said body portion, means pivotally connecting one end of said one lever to the said first member, and means pivotally connecting the other end of said one lever to the said second member.

9. A device according to claim 8, in which said first member has an extension to which the said one end of said one lever is pivotally connected.

10. A device according to claim 9, in which said extension defines a recess in which is slidably received the said one end of the said one lever whereby to provide the pivotal connection thereof.

11. A device according to claim 10, including damping means fast with said extension and adjacent said recess and connected to said one end of said one lever whereby to oppose sliding motion thereof in one direction.

12. A device according to claim 8, including a further lever pivotally connected to the said first member and to the said one end of said one lever.

13. A device according to claim 8, including
switch means supported on said body portion,
a switch-operating member pivotally connected to said body portion, a toggle spring biassing said switch-operating member away from a switch-operating position, and
actuating linkage coupling said first member and said switch-operating member for moving said switch-operating member into said switch-operating position when said second member moves away from said first member as a result of said force applied by said spherical inertia element, said actuating linkage comprising
first and second head elements respectively disposed on opposite sides of said switch-operating member,
a rod member attached to said first head element and to said second member for moving said first head element away from said switch-operating member when said second member moves away from said first member, and
a compression spring mounted between said second member and said second head element and arranged to be compressed when said second member moves, the compressive force of said second spring acting through the said second head element to force the switch-operating member towards said first head element and into said switch-operating position against said toggle spring.

References Cited
UNITED STATES PATENTS

| | | |
|---|---|---|
| 785,816 | 3/1905 | Mason. |
| 2,778,896 | 1/1957 | Tollefsen _____ 200—61.5 |
| 2,879,349 | 3/1959 | Thompson _____ 200—61.5 |
| 2,972,026 | 2/1961 | Kendall _____ 200—61.5 |
| 3,229,060 | 1/1966 | Russakov _____ 200—61.45 |

BERNARD A. GILHEANY, *Primary Examiner.*

H. B GILSON, *Assistant Examiner.*